United States Patent

Hanson et al.

[11] Patent Number: 5,974,398
[45] Date of Patent: Oct. 26, 1999

[54] METHOD AND APPARATUS ENABLING VALUATION OF USER ACCESS OF ADVERTISING CARRIED BY INTERACTIVE INFORMATION AND ENTERTAINMENT SERVICES

[75] Inventors: Bruce Lowell Hanson, Little Silver; Kenneth Mervin Huber, Red Bank, both of N.J.

[73] Assignee: AT&T Corp., Middletown, N.J.

[21] Appl. No.: 08/838,863

[22] Filed: Apr. 11, 1997

[51] Int. Cl.$^6$ .................................................. G06F 17/60
[52] U.S. Cl. ............................. 705/14; 705/10; 379/88.2
[58] Field of Search .................... 705/10, 14; 706/10; 380/24; 379/88, 88.2

[56] References Cited

U.S. PATENT DOCUMENTS

| | | | |
|---|---|---|---|
| 4,850,007 | 7/1989 | Marino et al. | 379/88.2 |
| 5,187,735 | 2/1993 | Herrero et al. | 379/88 |
| 5,220,501 | 6/1993 | Lawlor et al. | 380/24 |
| 5,479,491 | 12/1995 | Herrero Gracia et al. | 379/88 |
| 5,502,636 | 3/1996 | Clarke | 705/10 |
| 5,727,129 | 3/1998 | Barrett et al. | 706/10 |
| 5,781,632 | 7/1998 | Odom | 380/24 |
| 5,794,210 | 8/1998 | Goldhaber et al. | 705/14 |

OTHER PUBLICATIONS

The Design and Impletation of a Secure Auction Service, IEE Transactions on Software Eng., vol. 22, No. 5, May 1996.

*Primary Examiner*—Allen R. MacDonald
*Assistant Examiner*—M. Irshadullah

[57] ABSTRACT

Interactive information and entertainment service customers see advertisers' bids for their attention which are displayed on their display screens and choose which advertisements to view. For each advertisement viewed, the advertisers' bid amount would pay for a portion of the user's service or usage charge. A display on the user's terminal screen includes the advertisers most willing to pay for the user's attention and the dollar amount bid. If the user chooses to see a particular advertiser's message, then the user is reimbursed, or a credit is applied to the user's service account for the amount of the bid promised by the advertiser whose message was viewed. Customer interest profiles and service usage data collected by the service provider are used to identify particular user characteristics to advertisers. Advertisers define user characteristics of particular desirability and place a dollar value on having messages viewed by individual users based on the desirability of the user.

23 Claims, 15 Drawing Sheets

FIG. 2

201 — Advertiser Name: Wilson Sport

Offer ID: WS.ten12333

202 — Offer Start Date: 1/17/97

204 — Offer End Date: 2/16/97

206 — Bid #1:
    Target User Characteristics:
    Sex: M/F
    Age: 28-35
    Income: > 50,000
    Location (Zip Codes): 92*, 93*, 94*, 96*
    Session Context: Tennis BB, Tennis E-Shop
    Bid: $.45

208 — Bid #2:
    Target User Characteristics:
    Sex: M/F
    Age: 36-52
    Income: > 75,000
    Location (Zip Codes): 92*
    Session Context: Tennis BB, Tennis E-Shop
    Bid: $.75

210 — Response Options: User Name, Address, & Access Date

212 — Adv. Content (DB Ref): ..\WS\ten12333

214 — Contact: Jack Doe, Ph. 617-555-9865

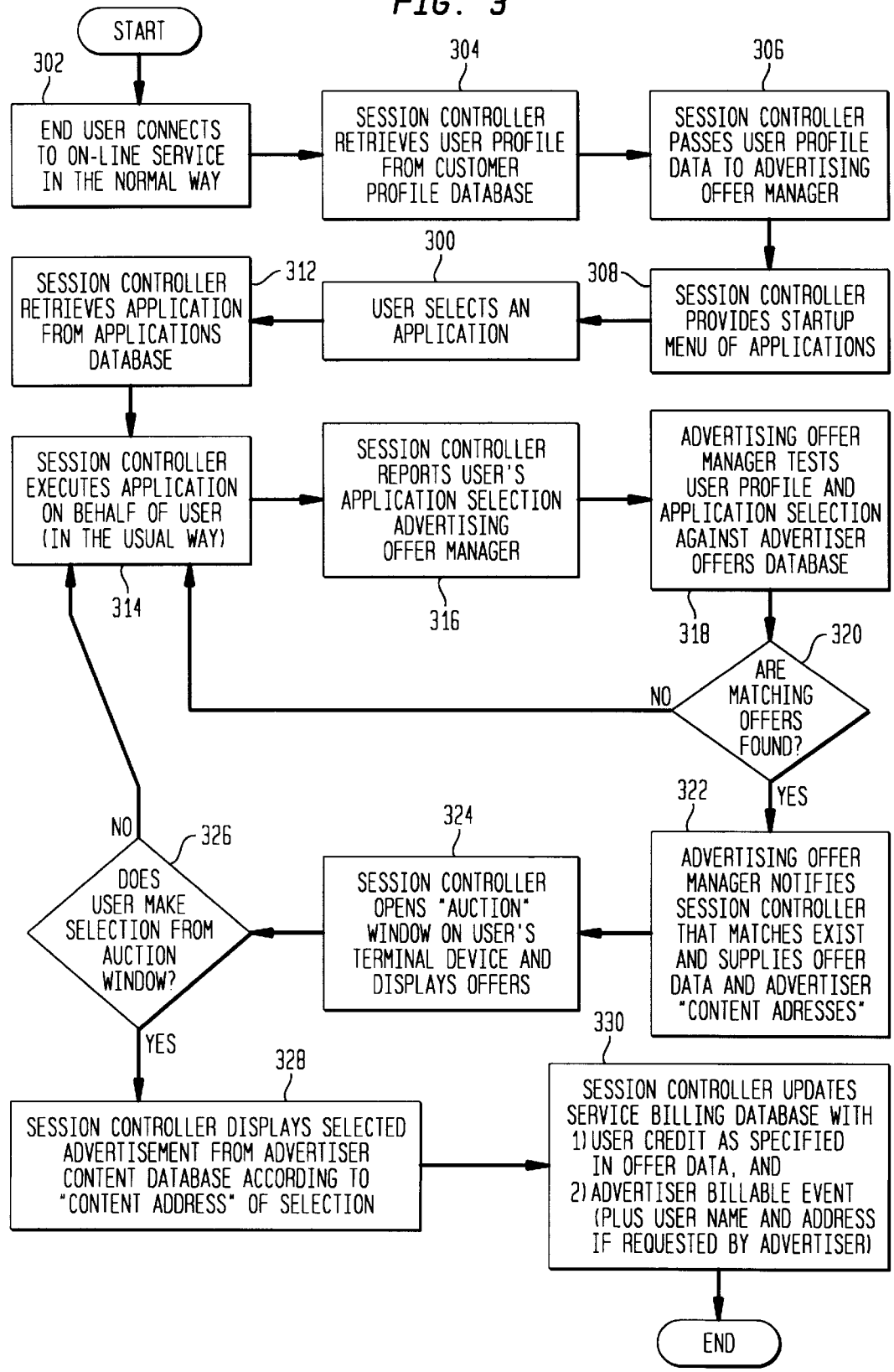

METHOD AND APPARATUS ENABLING VALUATION OF USER ACCESS OF ADVERTISING CARRIED BY INTERACTIVE INFORMATION AND ENTERTAINMENT SERVICES

TECHNICAL FIELD

This invention relates to telecommunications, and more particularly to a method and apparatus enabling user control of advertising carried by interactive information and entertainment services.

BACKGROUND

Most entertainment and information media such as television, radio, newspapers, and magazines are heavily subsidized by advertising. A recently emerging medium is on-line services in which a customer connects to an information service via a computer and telephone line. Many on-line services are subscription-based and require a fee to use. Accordingly, on-line services could be significantly more attractive to customers if the subscription costs could be reduced by advertiser subsidies. Unfortunately, on-line service providers have not yet found a way to deliver advertising in ways that are both effective for advertisers and acceptable to the customer. This is largely because a balance has not been found between consumers' desire to have complete control over their on-line experience (and its cost) and the advertiser's need to deliver its message to the customer. Unlike many traditional information media, an on-line service may charge its customers according the amount of time the customer is connected to the on-line service. Thus, viewing advertising may cost the customer money.

SUMMARY

The present invention solves the problems associated with advertising in interactive information or entertainment services or on-line services, by combining database marketing with the concept of an auction for the customer's attention where the on-line user has final say over which advertisements are viewed. Interested users see advertiser's bids for their attention which are displayed on their computer screens, and then choose which advertisements to view. For each advertisement viewed, the advertisers' bid amount would pay for a portion of the user's service or usage charge.

The database marketing portion of the invention uses customer interest profiles and on-line service usage data to identify particular user characteristics to advertisers. The advertisers define user characteristics of particular desirability and place a dollar value on having messages viewed by individual users based on the desirability of the user.

The auction portion of the invention includes a display on the user's display device of the advertisers most willing to pay for the user's attention and the dollar amount bid. If the user chooses to see a particular advertiser's message, then the user is reimbursed, or a credit is applied to the user's on-line account for the amount of the bid promised by the advertiser whose message was viewed. Other types of reward can also be provided to the user, such as, merchandise or services.

Several embodiments of the invention are described, including application to networks such as a telephone network, an internet network, a cable television network, a direct TV network, an earth-orbiting satellite communications network, or a radio frequency communications network. Examples of the advertisers' bidding include bidding by sealed bid, competitive bidding, or absentee bidding.

The discussion in this Summary and the following Brief Description of the Drawings, Detailed Description, and drawings only deal with examples of this invention and are not to be considered in any way a limitation on the scope of the exclusionary rights conferred by a patent which may issue from this application. The scope of such exclusionary rights is set forth in the claims at the end of this application.

BRIEF DESCRIPTION OF THE DRAWINGS

FIG. 2 is an example of an advertiser offer or bid specification, in accordance with the invention.

FIG. 3 is a flowchart of a usage example of an on-line service advertising auction, in accordance with the invention.

DETAILED DESCRIPTION

Figure 1:
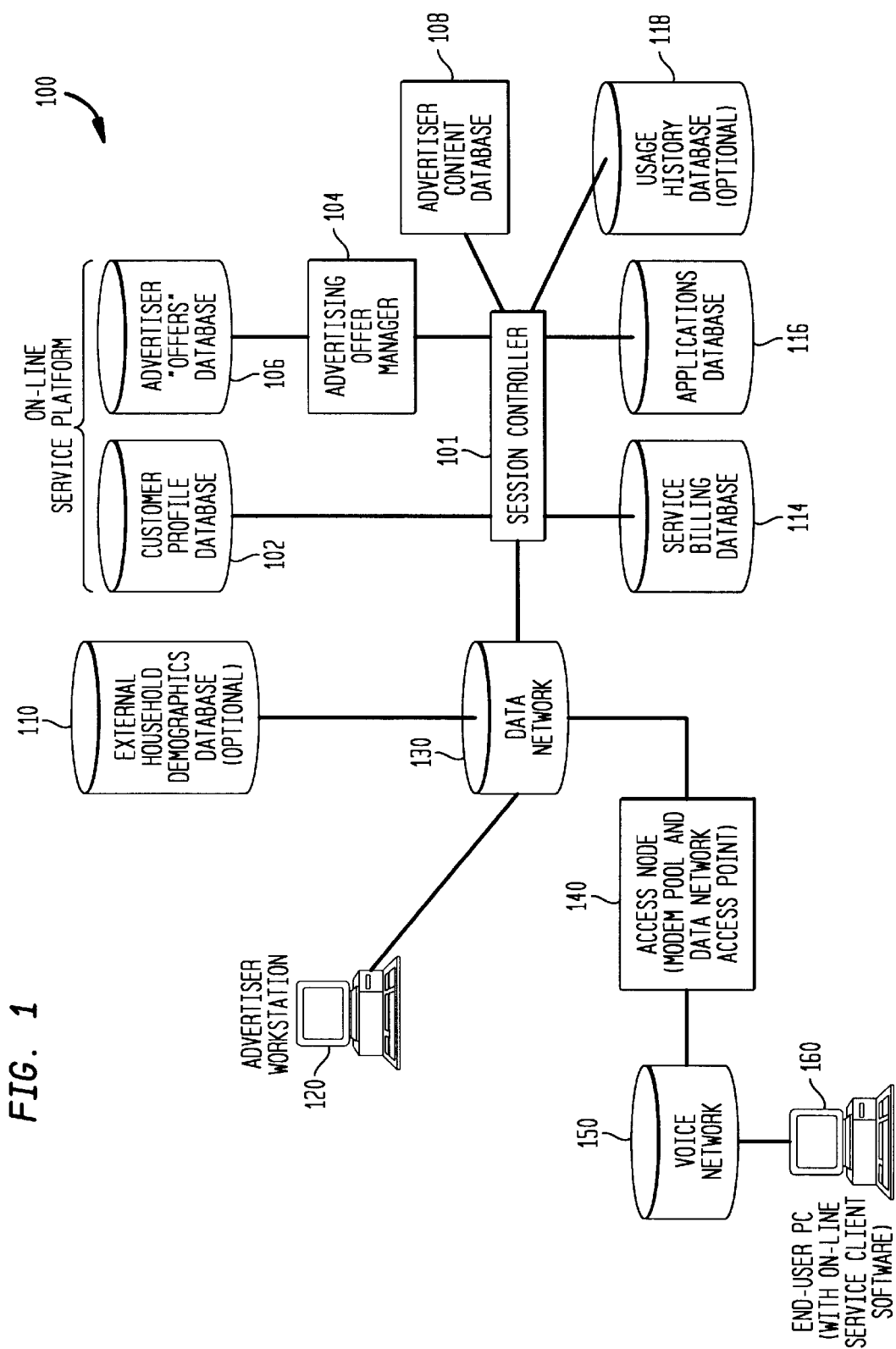
FIG. 1 is a simplified block diagram of an exemplary on-line service architecture employing the principles of the present invention.

FIG. 1 is a simplified block diagram of an exemplary interactive service architecture, in this case an on-line service, employing various principles of the present invention. In particular, FIG. 1 shows an on-line service platform 100 connected to an advertiser workstation 120 via a data network 130. Data network 130, in this illustrative example of the invention, comprises a conventional data transport network such as that available from communication service providers. However, data network 130 may include other networks including computer networks such as the Internet, or private data networks such as local-area and wide-area networks. Data network 130 is coupled to an access node 140 to facilitate access via a voice network 150 by a on-line service customer's personal computer ("PC") 160. Voice network 150 in this example of the invention is a conventional public switched telephone network ("PSTN") that is known.

While PC 160 is shown in FIG. 1, other types of communication interface devices are intended to fall within the scope of the invention. For example, other known terminal devices may be used including computer terminals, telephones, wireless devices, television sets, screen phones, and other devices or combinations of devices which facilitate two-way communication between a customer and an information service provider.

PC 160 is loaded with typical on-line service client software to allow the customer to interact with the on-line service provided from on-line service platform 100. It is emphasized that the present invention is intended to work with may kinds of on-line service, including those which provide news and information in an interactive manner, for example AT&T Worldnet®. However, for purposes of clarity in exposition, a hypothetical on-line service will be used to illustrate the principles of the invention. The on-line service in this example includes a number of sport-oriented bulletin boards where users can post and read messages, news sources, information resources where users can download software and other files, and the like.

Data network 130, as shown in FIG. 1 is coupled to receive communications from voice network 150 via access node 140. Access node 140 facilitates the exchange of information between the networks using a conventional modem pool (not shown) which is coupled to an access point in data network 130. The particular architecture of FIG. 1 conveniently allows the on-line service user to access the on-line service platform 100 using conventional dial-up procedures over the widely deployed PSTN. However, in some applications of the invention, it may be desirable for some users to have direct access to data network 130. For example, high volume or commercial users may use dedicated private lines (not shown) to access data network 130 thus bypassing voice network 150 and access node 140 altogether.

Data network 130 is coupled to advertiser workstation 120, which in this example is a personal computer that is adapted to communicate with data network 130 over a data network line. Advertiser workstation 120 allows an advertiser to interact with on-line service platform 100 to provide advertising to the on-line service users in accordance with the invention. Specifically, as will be described in more detail below, advertiser workstation 120 communicates with on-line service platform 100 to provide advertising content. Advertiser workstation 120 also communicates to on-line service platform 100 a set of defined user attributes and characteristics, and weights applied to such attributes. These attributes, characteristics, and weights are communicated with on-line service platform 100 so that bids for a user's attention may be developed by the advertiser and communicated in accordance with the principles of the invention. While an advertiser workstation is used to highlight the principles of the invention, such workstation is merely illustrative. The advertiser may also interact directly with the on-line service platform, for example by interacting with a human representative of the on-line service, or automatically using conventional automated response platforms such as those sold under the trade name Conversant® by Lucent Technologies Inc. While only a single advertiser workstation is shown in FIG. 1 for convenience, it is envisioned that a particular advertiser may wish to use more than one workstation, and further that a plurality of advertisers are coupled to interact with the on-line service platform 100 in order to place a variety of advertising before users of the on-line service.

Commercial consumer demographics database 1 10 may be optionally coupled to data network 130 via a data network line. Such optional database may be advantageously utilized in instances where on-line service platform 100 is not provisioned with user-profile information directly (for example, by customer profile database 102 as in this illustrative example of the invention). Such demographics databases are widely available and known and contain information about consumers that may be of interest to particular advertisers.

Customer profile database 102 is used, in this illustrative example of the invention, by advertisers to calculate bids for on-line service user's attention. However, it is emphasized that use of a customer profile database is optional. Particular advertisers may, in some applications of the invention, elect to calculate bids without using demographic information, or may choose to develop the necessary demographic information using internal resources or by other means. The customer profile can also include personal interests such as sports or collections of the user.

Continuing with the description of FIG. 1, on-line service platform 100 contains an on-line service session controller 101 which interacts with a number of databases, including customer profile database 102, advertiser offers database 106, advertiser content database 108, service billing database 114, and applications database 116, as shown. Current usage history database 118, described below, is optionally coupled to on-line session controller 101, as shown in FIG. 1. A buffer is used to store the current user's and current advertiser's identities who are online.

Advertiser offers database 106 is coupled to on-line service session controller 101 via advertising offer manager 104. Those skilled in the art will recognize that the functions of on-line service session controller 101 and advertising offer manager 104, may in some applications of the invention, be combined in a single device. Alternatively, it may be desirable to implement the functions of on-line service session controller 101 and advertiser offer manager as program modules that are executed on a general purpose computer.

Advertising offer manager 104 combines the advertiser-defined user attributes received from the advertiser workstation 120, the current application context from the session controller 101, and user profiles from customer profile database 102 to calculate and present the advertiser's bid to a user working at PC 160. Prior user context from usage history database 118 may be also be optionally utilized in combination with data from these databases to calculate and present bids.

Customer profile database 102 includes such information as demographic information about the user (age, gender, marital status, residence, etc.) as well as user specified interests such as tennis or golf. Customer profile database 102 may also be employed to track and manage other service issues such as security, passwords, user preferences, and the like.

Usage session history database 118 includes historical information related to an individual user's prior online session usage. The on-line service provider typically uses such information to track a particular session to maintain session integrity and improve session efficiency, among other uses. Such past usage may include, for example, the frequency with which a user visits a particular bulletin board. Alternatively, such past usage history may be tracked and stored in customer profile database 102.

Advertiser offers database 106 stores offers or bids that are presented to users. These offers or bids are auction-type bids that present to the user a bidding value to induce the user to have the advertising message displayed. The inducement is the offer or bid of something of value to the user. The thing of value can either be a credit to the user's service or usage charges, or a credit to the user's bank account, or other forms of value to the user. The advertising messages, or advertising presentation applications themselves, are stored in the advertiser content database 108. Information regarding the number of times a particular advertisement is viewed, by whom and at what times, and whether viewed previously by a particular user, may be optionally stored in advertiser offers database 106. Each of the aforementioned databases utilize conventional storage devices, such as computer memory and disks which are well known. In addition, conventional methodologies for storing and retrieving information from the databases may be used to facilitate practice of the present invention.

On-line service billing database 114 stores the typical information that is related to an on-line users account. For example, utilization of the on-line service is tracked so that a bill for such services can be calculated and generated. In accordance with the principles of the invention, on-line service billing database 114 is also used to store credit and reimbursement information that results when a user accepts an advertiser's bid and views the message or advertisement. When an advertiser's bid is accepted by a user, the bid amount is credited against the user's current on-line service charge and an appropriate notation is recorded in on-line service billing database 114. Other forms of reward can be given to the user, such as, merchandise can be offered at a reduced price or for free. In this case, the bidding value for the reduced price or free merchandise would be the regular price of the merchandise.

Figure 4:
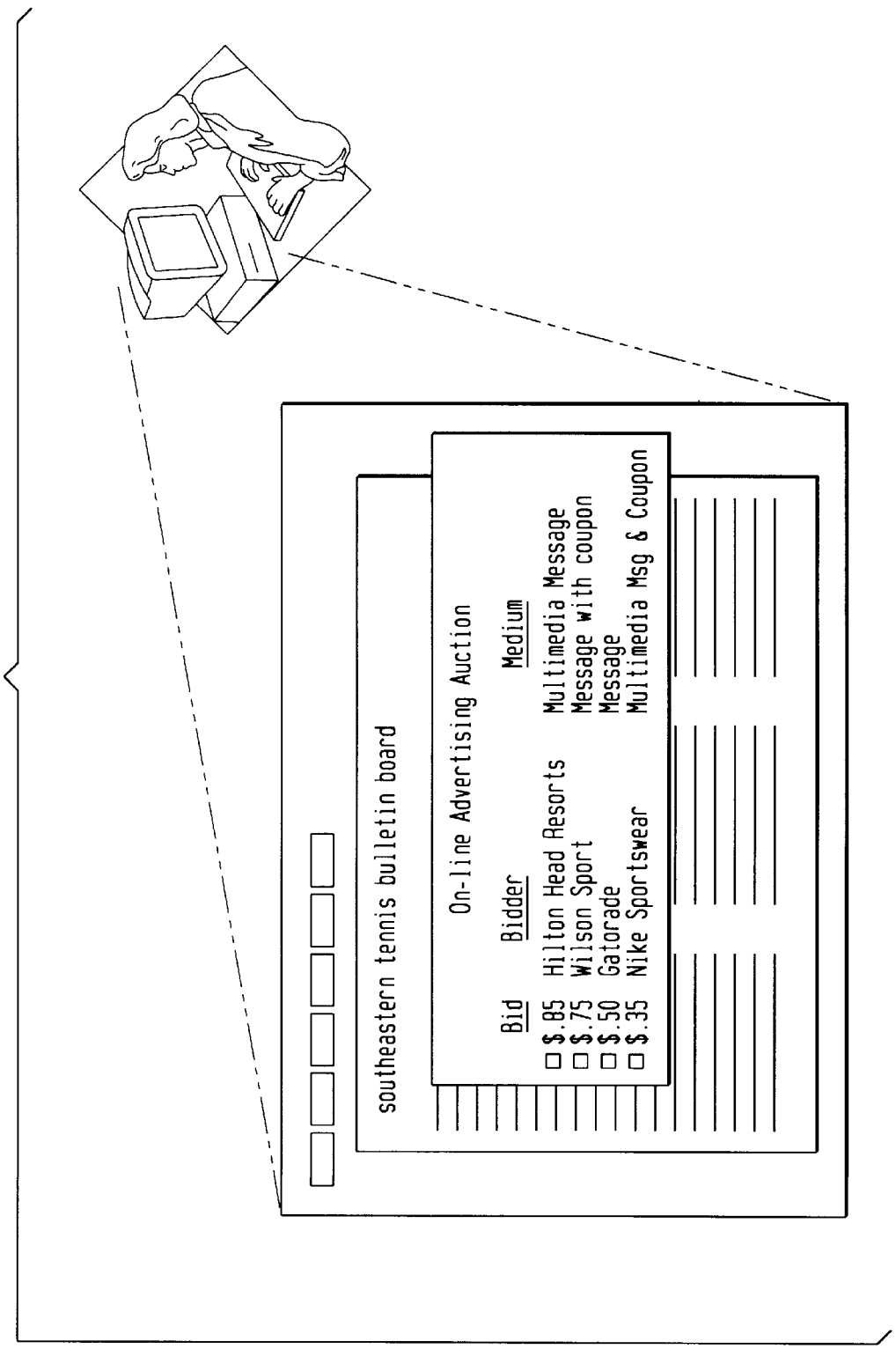
FIG. 4 is an illustration of a exemplary computer screen display facilitating an advertising auction, in accordance with the invention.

The on-line service session controller 101 displays bids for the user's attention from advertisers. In this particular exemplary embodiment of the invention, on-line session controller 101 controls the presentation of the top four bids (in terms of dollars bid) from advertisers. On-line service session controller 101, accordingly, continuously tracks the input from the advertising offer manager 104 in order to provide the on-line service user with sufficient information to make decisions as to which, if any, advertisements the user will view. The user receives offers or bids as shown in FIG. 4. When the user chooses an offer or bid, this results in a presentation of advertising content from the advertising content database 108. The advertising content can be an interactive application that is presented to the user, for example, an order form that the user fills out and sends by e-mail back to the advertiser. Other forms of advertising content can include online shopping, the consent to receive a sales call by telephone, or other actions which the user is induced to perform for the advertiser. In exchange for the advertiser providing something of value to the user. The advertiser can be a conventional commercial enterprise offering it's products or services in the form of advertising messages. Alternately, the advertiser can be, for example, a political party advertising it's candidate for election. Alternately, the advertiser can be a market research firm soliciting demographic information or personal information from the user. The advertiser can adjust the value of the offer or bid which is used to entice the user to select the advertisement. The value of the offer or bid which is auctioned to the user can be established based upon the user's personal characteristics such as personal income or age. The advertiser can specify the income or age by constant values as is shown in FIG. 2, or alternately the advertiser can establish algebraic formulas which relate the offer or bidding value to the numerical age or numerical income of the user.

FIG. 2 is an example of an advertiser offer specification which illustrates the kind of information an advertiser might supply to facilitate the practice of the present invention. It is envisioned that an advertiser could electronically receive this form at advertiser workstation 120. The form is then returned to on-line session controller 101 and advertising offer manager 104, using, for example, electronic mail. Alternatively, the information contained in the offer specification shown in FIG. 2 may be supplied by the advertiser using other conventional means; for example, telephoning an automated or live agent of the on-line service provider, or mailing the completed form via regular mail or delivery service. Regardless of the manner in which the information is collected from the advertiser, the collected information from the advertiser is stored in advertiser offer database 104.

In this illustrative example of the invention. the advertiser's name is Wilson Sport, as noted in field 201 of FIG. 2. Fields 202 and 204, respectively, indicate the start and ending dates of a particular advertisement or offer. Fields 206 and 208 contain targeted user characteristics of bids for two advertisements or offers. It is emphasized that the illustration of two bids is merely illustrative. Likewise, the subfields in fields 206 and 208 illustrate the various types of user characteristics that may typically be utilized when practicing the invention, but many types of user characteristics may also be used and are intended to fall within the scope of the invention. For example, gender, age, income, geographic information and session content are shown in FIG. 2 as an illustration of the type of user characteristics that are of interest to Wilson Sport. However, other advertisers may choose to target profession, number of children in the household, types of vehicles driven, pets owned, and other demographic information.

Field 210 in FIG. 2 indicates the response options that are of interest to the advertiser, Wilson Sport in this example. User name and address and the date that the advertisement was viewed or accessed is returned to Wilson Sport in accordance with the invention.

Field 212 in FIG. 2 includes a reference as to the content of the advertisement. Field 212 is the advertising content as is stored in the advertising content database 108.

Field 214 in FIG. 2 includes the name and address of a contact at the advertiser. Other information about the advertiser may also be collected, for example, credit and financial data and the like.

FIG. 3 is a simplified flowchart of a usage example of an on-line service advertising auction, in accordance with the invention. The end on-line user at PC 160 starts the process by connecting to the on-line service in a conventional way in block 302. In block 304, session controller 101 retrieves that particular end user's profile from customer profile database 102 in on-line service platform 100 (FIG. 1). Session controller 101 passes the user profile information to advertising offer manager 104, as shown in block 306.

Session controller 101 provides a start-up menu of applications to the end user at PC 160 in a conventional manner, as shown in block 308 of FIG. 3. These applications are stored in applications database 116 (FIG. 1). Such applications include e-mail, bulletin boards, chat sessions, new groups, electronic shopping, and others that are typically provided a part of the suite of applications by many on-line service providers. In block 310, the user at PC 160 selects an application, and session controller retrieves the application from applications database 116 and executes the application, as shown in blocks 312 and 314, respectively.

In blocks 316 and 318, the session controller 101 reports the application selected to the advertising offer manager 104 which looks for a match among the user profile, selected application, and advertisement bids from the offer specifications which are stored in advertisers offer database 106, as discussed above. Referring briefly back to FIG. 2, fields 216 and 218 contain subfields which indicate that the advertiser Wilson Sport is interested in targeting users between the ages of 28 and 35 with annual incomes greater than $50,000 who live in particular geographic areas and select either bulletin board or electronic shopping applications related to tennis. If, in this particular session, a match between the targeted and actual attributes is made, then control is passed to block 322 from decision block 320, as shown. Otherwise, control is passed back to block 314, and the process of FIG. 3 repeats as the user moves from application to application during the session.

If a match is found, in block 322, the advertising offer manager 104 notifies the session controller 101 and provides offer data and advertiser content addresses. In response to the notification, session controller 101 in block 324 opens an auction "window" or frame on PC 160 to display the bids of the advertiser. It is noted at this point in the discussion that the flowchart shown in FIG. 3 is illustrative of a single bid process. The invention contemplates many such bid processes occurring in parallel. That is, the window displayed on PC 160 may display a variety of bids from multiple advertisers. The user may choose to see the advertisement associated with the highest bid, or may select the view the advertisements associated with any bid.

At decision block 326, if the user selects no bids from any advertiser, then control returns back to block 314 and the process of FIG. 3 repeats as the user moves from application to application during the session.

If the user does select an advertisement associated with a particular bid, then as shown in block 328, session controller 101 displays an advertisement from advertisement content database 108 according to the content address that was provided from advertiser offer manager 104 as described above. The process ends at block 330 as session controller 101 updates service billing database 114 with a credit corresponding to the bid amount as well as a record of the event so that the advertiser can be billed for the transaction. In cases where a user name and address are requested from the advertiser (as is the case with the Wilson Sport example here), the service billing database 114 is updated with this information for a subsequent delivery to the appropriate advertiser.

Turning now to FIG. 4, there is illustrated an exemplary screen display showing the top four bids from advertisers. Such exemplary screen would be displayed on the monitor of PC 160 shown in FIG. 1. It is emphasized that FIG. 4 is merely illustrative, as many styles of screens may be used, and any number of advertisers' bids may be conveniently shown. On-line service session controller 101 (FIG. 1) controls the display by showing the bid amount, the bidder (i.e., the name of the advertiser), and the advertisement medium. Thus, sufficient information is provided to the user so that the user can select and control which advertising is seen, but the complete message or advertisement is not presented until the user takes an affirmative action. As shown in FIG. 4, Hilton Head Resorts is the top bidder, followed by Wilson Sport and two other advertisers. As the bids are arranged by bid amount, an electronic auction for the on-line service user's attention is herein created. As bid amounts, or the bids themselves change, on-line service session controller 101 continuously, and dynamically, updates the screen display shown in FIG. 4 to reflect the new bid information.

It is envisioned that the bid amounts could change according to the success (or failure) of the advertiser in reaching his targeted audience. For example, if Wilson Sport is having good success in getting its message to the targeted users, then it may decide to lower its bid. Or, if fewer messages are being opened and read, then Wilson Sport may choose to raise its bid. Other factors may also affect the bid price, for example, budget constraints of the advertiser, exhaustion of promotional samples, offers, or other media, and the like. The bid price may also vary according to the user's interaction with the on-line service. For example, the attention of an on-line service user who has expressed an interest in tennis but who is currently looking at news headlines might be worth 50 cents to a sports clothing provider, but that same user's attention might be valued at 75 cents if the user starts reading e-mail postings on a tennis bulletin board.

Advertisers may choose to offer new advertisements, or discontinue presently offered advertisements according to their particular needs, or according to similar criteria associated with bid price changes. A particular advantage of the present invention is that advertisers are able to receive feedback on the effectiveness of a particular advertisement quickly. Such feedback is either nonexistent or significantly slower with traditional advertising media.

Figure 5:
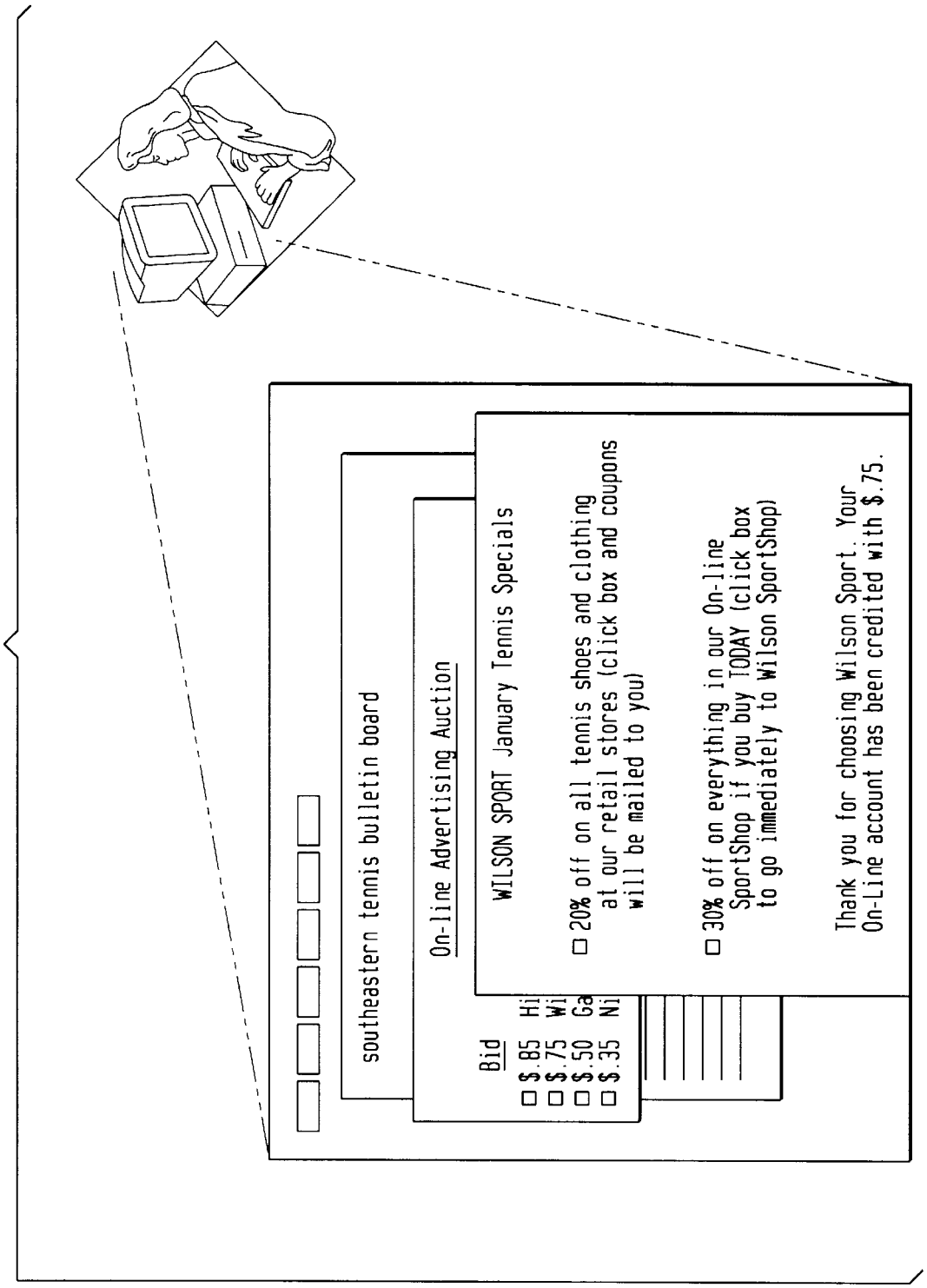
FIG. 5 is an illustration of an exemplary computer screen display showing an advertisement presented in response to a user "bid" selection.

As mentioned above, and as shown in FIG. 5, the message or advertisement medium is presented to the on-line service user as part of the auction process. A number of different media are encompassed within the scope of the present invention, including multimedia (for example, a mix of sound, video, still images, and/or interactive computing), e-mail, voice mail, and traditional mail. The messages or advertisements may, at the option of the user, be viewed or received immediately or in the future. Those skilled in the art will recognize that traditional advertising concepts such as sales promotions may readily be incorporated into the present inventive concept.

The exemplary computer display screen shown in FIG. 4 is preferably implemented as an active region on the on-line service user's display device so that it may be refreshed and updated with auction information in a dynamic manner. Thus, an on-line service user may choose to size and position the auction display region in a convenient location on the user's electronic work space so that, if the user chooses, the user can continuously monitor the advertising auction without disrupting the interaction with the substantive (i.e., non-advertising) portion of the on-line service. In some applications of the invention, it may be desirable for the on-line session controller 101 to be user-configurable so that the number and types of advertisements presented in the auction are selectable. Such control, along with frequent changes in the advertising offerings in the auction, is envisioned to be of some entertainment value to users in and by themselves which provides yet further advantages in the practice of the present invention in on-line service contexts.

An example of the operation of the present invention is now presented. An advertiser at advertiser workstation 120 determines characteristics of on-line service users of particular interest. In this illustrative example of the invention, one particular advertiser as noted above is a tennis equipment retailer. The retailer is named Wilson Sport and specializes in both retail and on-line sales. Wilson Sport may be interested, for example, in targeting on-line service users who are married males, between the ages of 35 and 50, with annual household incomes of $50,000 or more who are avid tennis players, to receive notice of a particular promotion of tennis equipment. Wilson Sport, via advertiser workstation 120 and data network 130, contacts on-line service platform 100 and indicates that it will pay the on-line service, for example, five cents per user to have its tennis promotion message offered to users who meet the targeted profile, plus 20 cents for each user who opens and reads the message. Wilson Sport may also pay, for example, an additional 75 cents for every user who matches the targeted profile and is presently or regularly accessing a tennis bulletin board, with the payment going to defray the user's on-line session charge.

The concept of weighted attributes and characteristics may also be applied to the present invention. That is, certain attributes and characteristics of a user may be more valuable to the advertiser than others. For example, an advertiser may wish to place emphasis on the type of on-line information that a user is currently accessing at the time of auction.

Figure 6:
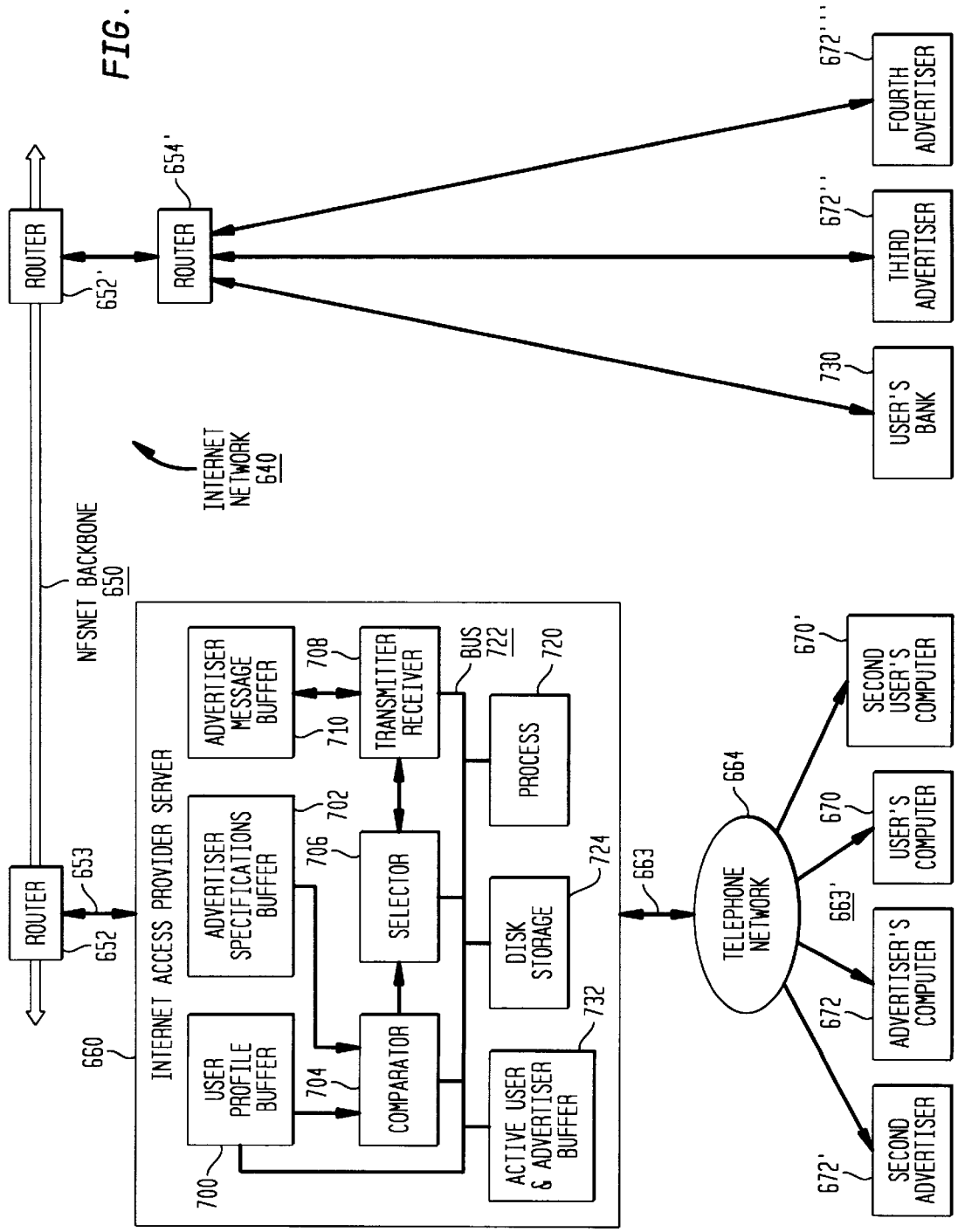
FIG. 6 is illustrates an alternate embodiment of the invention as applied in an Internet network.

An alternate embodiment of the invention is shown in FIG. 6, as it is applied in an internet network 640. The internet network consists of the National Science Foundation Network backbone (NSFNET) 650 which interconnects router 652 with the router 652'. The internet access provider server 660 is connected by means of line 653 to the router 652. The internet access provider server 660 is connected by line 663 to the telephone network 664. The user's computer 670 is connected by the line 663' to the telephone network 664. The advertiser's computer 672 can also be connected to the telephone network 664. Still further, the plurality of user computers such as the second user's computer 670' can be connected to the telephone network 664. A plurality of advertisers such as the second advertiser 672' can be connected to the telephone network 664. The router 652' in the backbone network 650, can be connected through he router 664' to a third advertiser 672" and a fourth advertiser 672''', and also to the user's bank 730.

The internet access provider server 660 includes a data processor 720 connected by means of the bus 722 to the disk storage 724 and to the active user and advertiser buffer 732. The on-line activity of the user's computer 670 and the second user's computer 670' is maintained in the active user and advertiser buffer 732. The on-line activity of the advertiser's computer 672 and a second advertiser 672' is also maintained in the active user advertiser buffer 732. The user profile buffer 200 of FIG. 6 is equivalent to database 102 and database 110 of FIG. 1. The advertiser specifications buffer 702 of FIG. 6 is equivalent to database 106 of FIG. 1. The advertiser message buffer 710 of FIG. 6 is equivalent to database 108 of FIG. 1.

Figure 11:
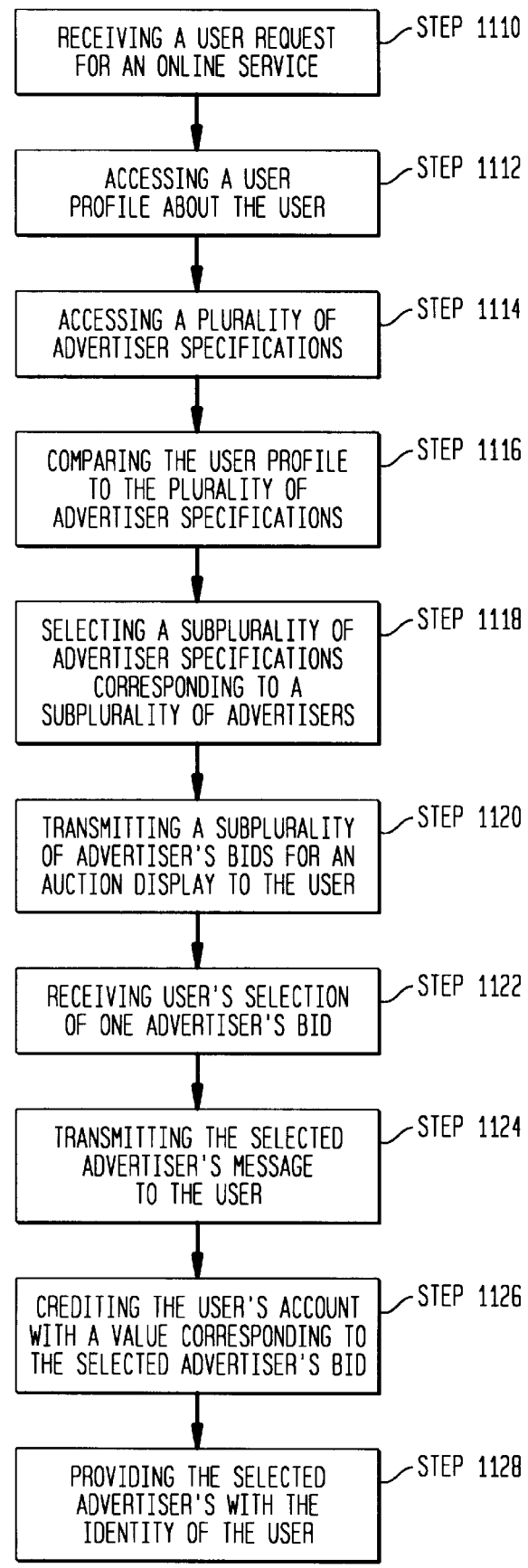
FIG. 11 is a flow diagram of a sequence of operational steps carrying out the invention, with the advertisers providing sealed bids to the user.

FIG. 11 is a flow diagram of the sequence of operational steps carried out by the internet access provider server 660, in accordance with the invention, with the advertisers providing sealed bids to the user. By sealed bids, it is meant that the respective advertisers participating in the bidding do not see what the other advertisers are bidding to the user. The server 660 can receive from the user's terminal device 670 a user request for execution of a software application. The software application can be any one of a variety of services such as an on-line newspaper, on-line entertainment, or other Interactive Information and Entertainment on-line services provided on the internet. A cable TV system can monitor a viewer's channel selection and then during and a break in the presentation, the cable TV system can present the advertising auction to the viewer bids and messages from advertisers whose advertising interests are related to the viewers choice of channels. This user activity is buffered in the buffer 732. Step 1110 of FIG. 11 receives the user request for execution of an on-line service.

A user profile, which includes personal information and demographic information about a user, is stored in the user profile buffer 700. Advertiser specifications for the attributes of users which are of value to an advertiser for the purpose of selling products or services to such users, are stored in the advertiser specification buffer 702. The customer profile database 102 of FIG. 1 corresponds to the user profile buffer 700 of FIG. 6. The advertiser offers database 106 of FIG. I corresponds to the advertiser specifications buffer 702 of FIG. 6. FIG. 6 also shows the advertiser message buffer 710 which stores the advertiser content, as was described for the advertiser content database 108 of FIG. 1.

Step 1112 of FIG. 11 has the processor 720 and the server 660 of FIG. 6 accessing the user profile buffer 700 to obtain the user characteristics about the user whose computer 670 has input the request to the server 660. Step 1114 of FIG. 11 has the processor 720 of FIG. 6 accessing a plurality of advertiser specifications of user characteristics from the advertiser specification buffer 702, each of those specifications being associated with one of a plurality of advertisers. Step 1116 of FIG. 11 has the processor 720, in conjunction with the comparator 704, compare the characteristics of the user from the user profile buffer 700 with the user characteristics from each of the plurality of advertiser specifications accessed from the advertiser specifications buffer 701.

Step 1118 of FIG. 11 has the processor 720, in conjunction with the selector 706 select a subplurality of the plurality of advertiser specifications which corresponds to a subplurality of the plurality of advertisers. This selection can be a matching of age values of users that are currently on-line or viewing or participating, as represented by buffer 732, with the specifications for acceptable ages of prospective patrons in the advertiser specifications accessed from the buffer 702.

Step 1120 of FIG. 11 has the transmitter/receiver 708 of FIG. 6 transmit from the server 660 to the user's computer 670, a subplurality of offer or bid values which respectively correspond to each of the subplurality of advertisers identified by the selector 706. This is done for an auction display to the user at the user's computer 670 of the offer or bid values. The user will review the offer or bid values and select the one that is the most attractive to the user. The user can optionally select none, in which case the user will not be presented with an advertisement and correspondingly will not be credited, on his behalf with something of value. The user can also select more than one advertiser, just not for presentation at the same time.

Step 1122 of FIG. 11 has the transmitter/receiver 708 receive at the server 660 from the user's computer 670, the user's selection of one of the offer or bid values from the subplurality of offer or bid values that were presented and displayed to the user. The offer or bid value that is selected by the user corresponds to a selected advertiser from the subplurality of advertisers whose specifications have been accessed from the buffer 702. In response to the user having selected one of the several advertisers, the corresponding advertiser's message is accessed from the advertiser message buffer 710. Also, in response to the user having selected one of the several advertisers, and internet link to the advertiser's URL can also be presented to the user.

Step 1124 of FIG. 11 has the transmitter/receiver 708 of the server 660 transmit the advertising message about the selected advertiser to the user's computer 670, for display to the user. That message may be a standard sales presentation displayed to the user or alternately, it may be an on-line shopping presentation, or a form to be filled out by the user, or other advertising message.

In consideration for the user having selected a particular advertiser's message, step 1126 credits the user with something of value, such as crediting the user's on-line account with a credit for charges the user would otherwise have incurred in using on-line services. The value credited to the user can be an actual monetary value which is credited to the user's bank account at the user's bank 730 by means of a crediting message which is transmitted from the server 660 over the backbone network 650 to the user's bank 730. other forms of reward can be given to the user, such as, merchandise, for example, a T-shirt, a coffee mug, or other like item. The advertiser, such as the advertiser using advertiser's computer 672, may be provided with the identity of the user to allow the advertiser to add the user's name to the customer list, for example., as is provided in the step 1128 of FIG. 11. The service can track whether an advertisement has already been seen by the user and either exclude it from consideration, or offer it at a reduced rate depending on the advertiser's wish. A true bidding system can be set up to work like absentee bidding at a "real" auction: Wilson Sport bids 35 cents for a particular person's attention unless someone else is bidding higher, in which case Wilson's bid is automatically raised to 5 cents above the competitor—up to a maximum set by Wilson. The competitor can be set up to do the same thing so that the highest bidder ends up based on the upper limits set by the two competitive bidders.

Figure 7:
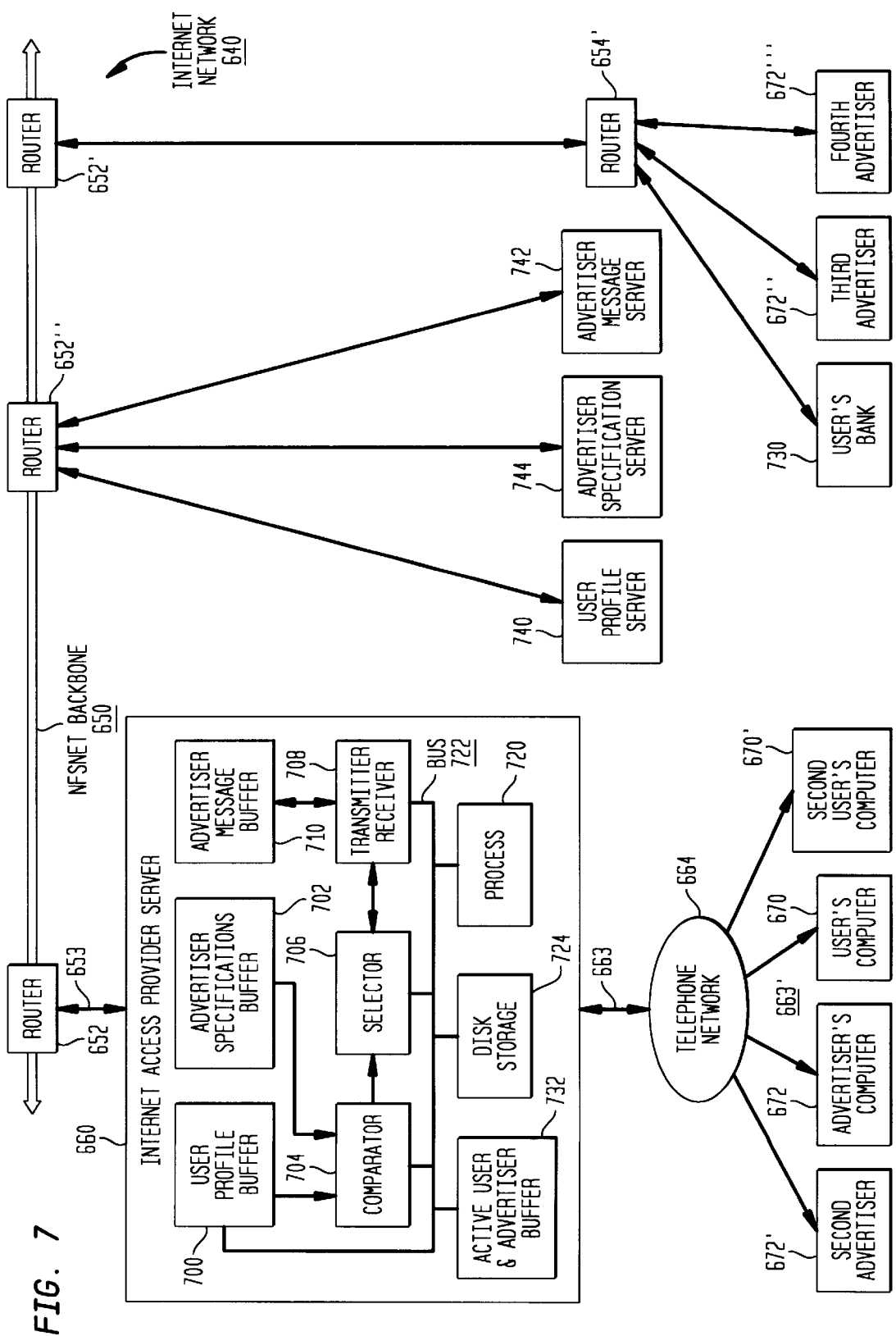
FIG. 7 is still another alternate embodiment of the invention employed in an Internet network.

FIG. 7 is an alternate view of the Internet network 640 of FIG. 6 which adds a user profile server 740, an advertiser specification server 744, and an advertiser message server 742 connected through the router 652" to the backbone network 650. This illustrates the capability of the Internet to provide for distributed storage of user profiles, advertiser specifications, and advertiser messages throughout the Internet network 640.

Figure 8:
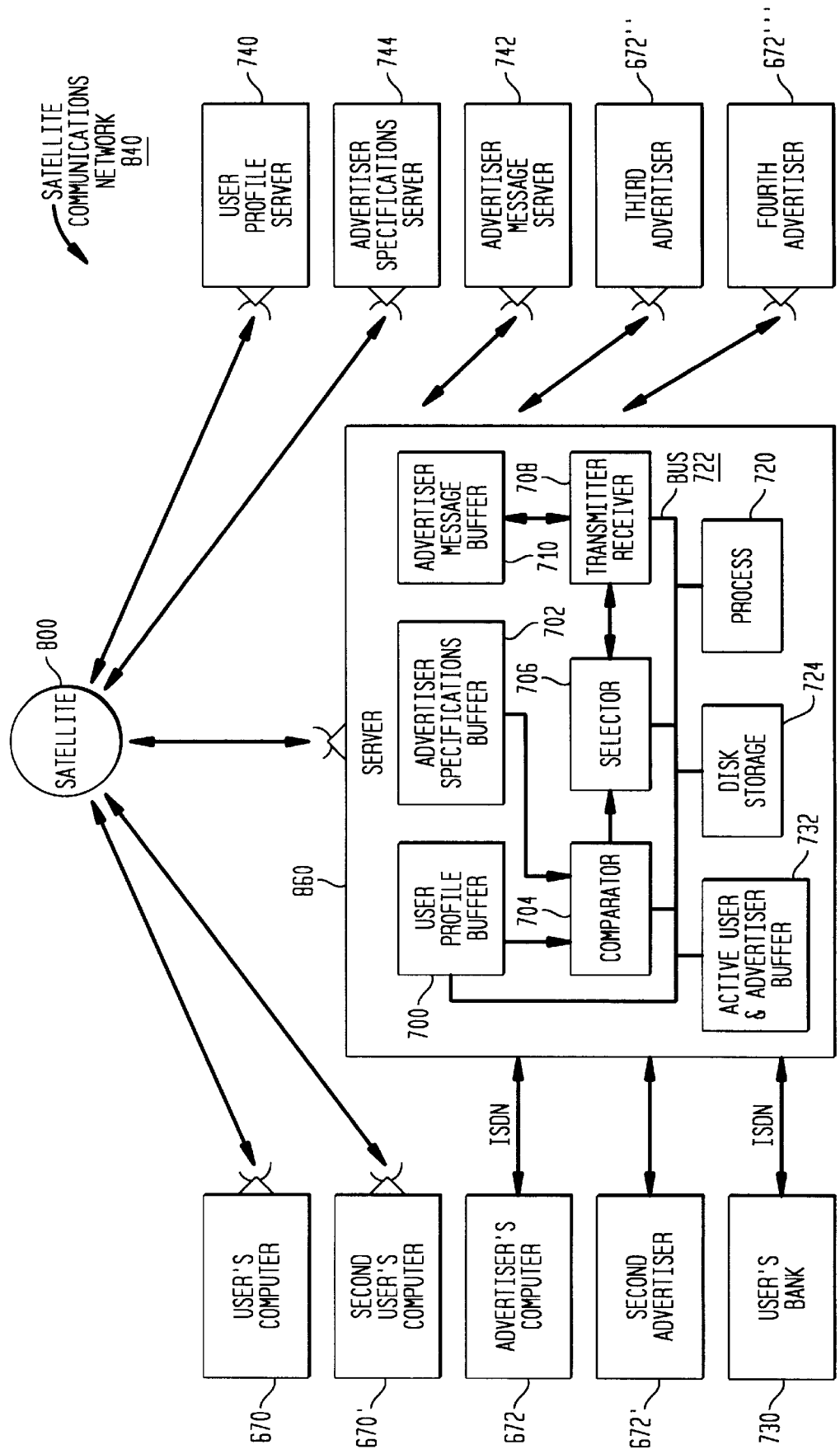
FIG. 8 is an alternate embodiment of the invention applied in a satellite communication network.

FIG. 8 illustrates an alternate embodiment of the invention where the server 860 performs substantially the same functions as the server 660 described for FIG. 6. The server 860 in FIG. 8 communicates by means of the satellite communications network 840 through the orbiting satellite 800 to the user's computer 670 and the second user's computer 670'. The advertiser's computer 672 is shown connected by a wireline ISDN connection to the server 860, as is this second advertiser 672' and the user's bank 730. The user profile server 740, the advertiser specification server 744, the advertiser message server 742, the third advertiser 672' and the fourth advertiser 672''' communicate by means of the satellite communications network 840 through the satellite 800 to the server 860. The network can be any type of interactive television network where the viewer can respond back to the server 860, such as over a telephone link.

Figure 9:
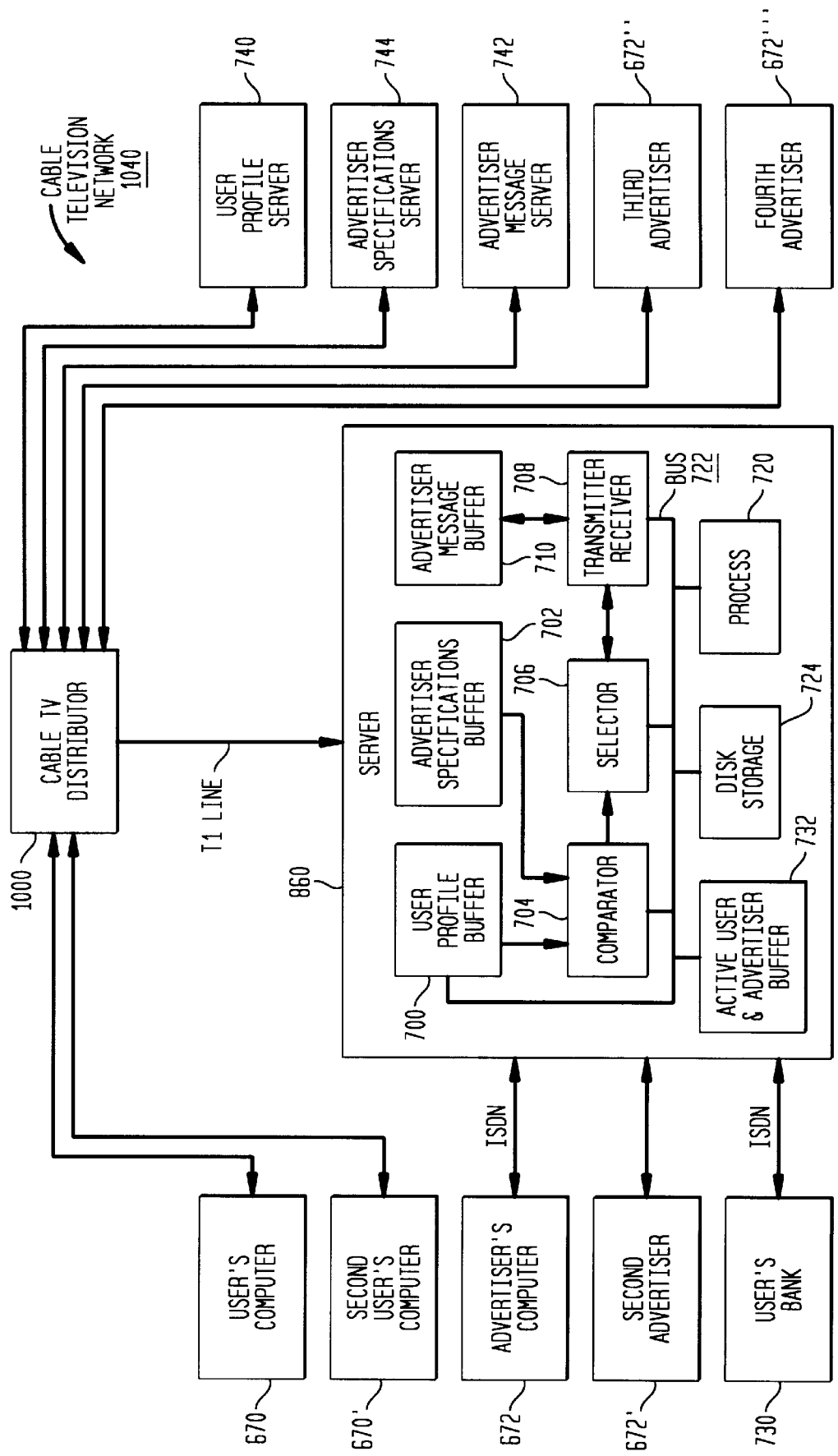
FIG. 9 is an alternate embodiment of the invention as applied in a cable television network.

FIG. 9 illustrates an alternate embodiment of the invention wherein the server 860 of FIG. 8 is connected by means of a T1 telephone link to the cable TV distributor 1000 in the cable television network 1040. The user's computer 670 and the second user's computer 670' are connected by means of cable TV connections to the cable TV distributor 1000. The advertiser's computer 672, the second advertiser 672' and the user's bank 730 are connected by wireline connections such as ISDN connections to the server 860. The user profile server 740, the advertiser specification server 744, the advertiser message server 742, the third advertiser 672" and the fourth advertiser 672''' can be connected by means of the cable television network 1040 to the cable TV distributor 1000.

Figure 10:
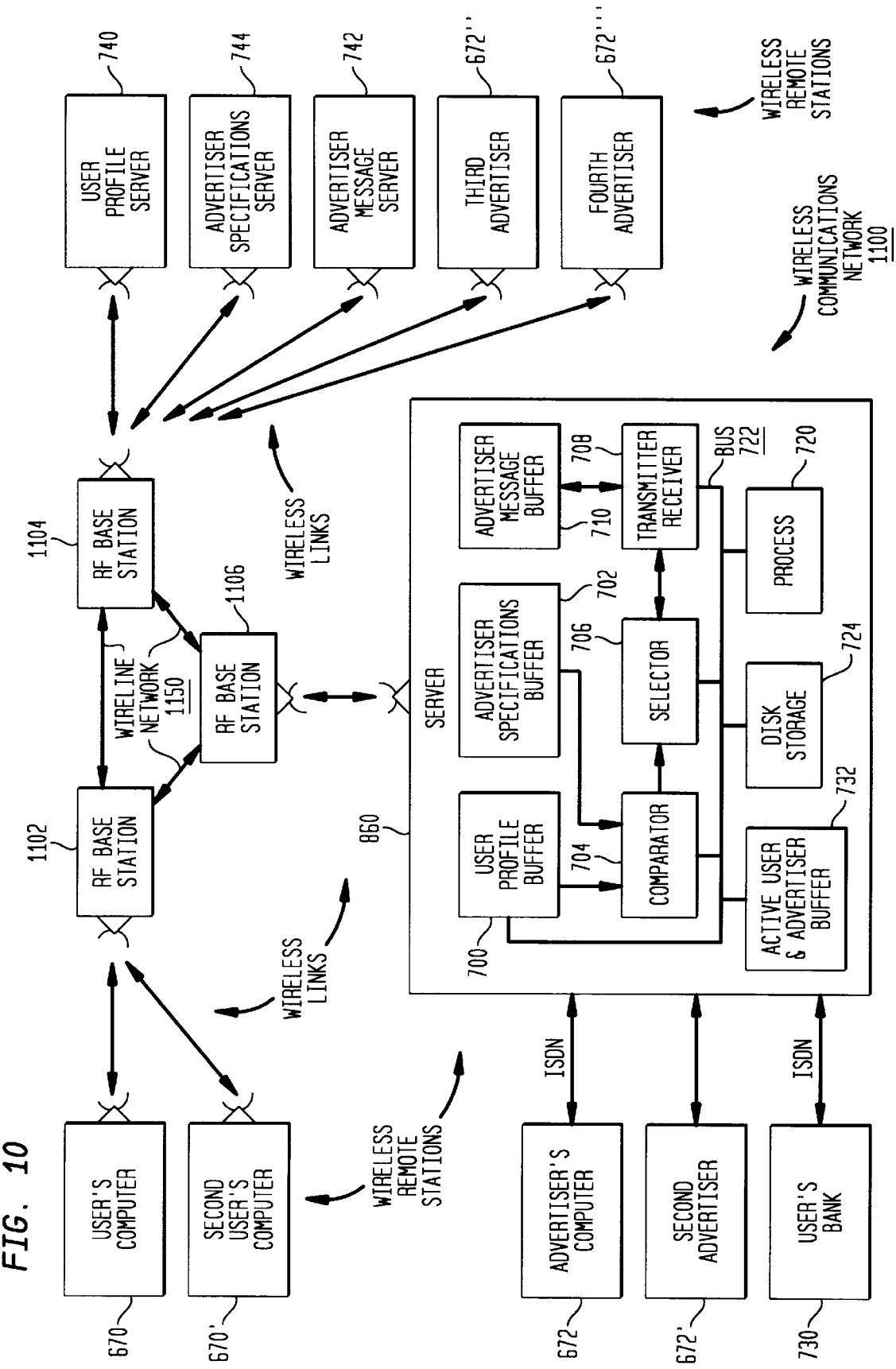
FIG. 10 is an alternate embodiment of the invention as applied in a wireless communications network.

FIG. 10 illustrates another alternate embodiment of the invention where the server 860 of FIG. 8 is connected by means of a wireless link to the radio frequency base station 1106 in the wireless communications network 1100. The radio frequency base station 1102 and the radio frequency base station 1104 are connected by wireline network 1150 to the radio frequency base station 1106. The user's computer 670 and the second user's computer 670' are connected by wireless links to the radio frequency base station 1102. The advertiser's computer 672, the second advertiser 672' and the user's bank 730 are connected by wireline connections such as ISDN connections to the server 860. The user profile server, the advertiser specification server 744, the advertiser message server 742, the third advertiser 672" and the fourth advertiser 672''' can all be wireless remote stations connected by wireless links in the wireless communications network 1100 to the radio frequency base station 1104. An example of a wireless communications network is described in the co-pending U.S. Patent application by Alamouti, et al., entitled "METHOD FOR FREQUENCY DIVISION DUPLEX COMMUNICATIONS," serial number 08/796, 584, filed Feb. 6, 1997 assigned to AT&T Wireless Services and incorporated herein by reference.

Figure 12:
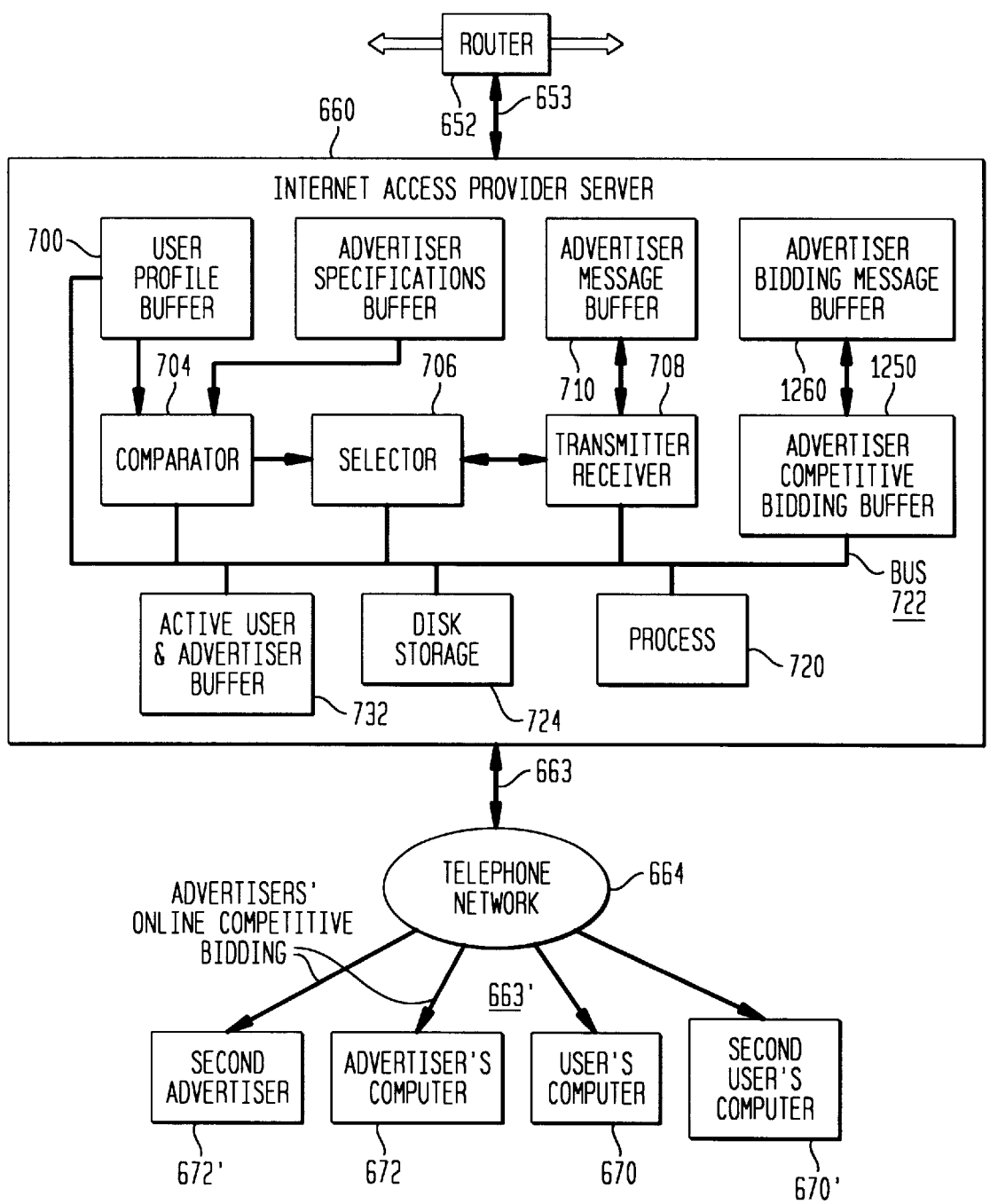
FIG. 12 is illustrates an alternate embodiment of the invention for advertisers' online competitive bidding, as applied in an Internet network of FIG. 6.
Figure 13:
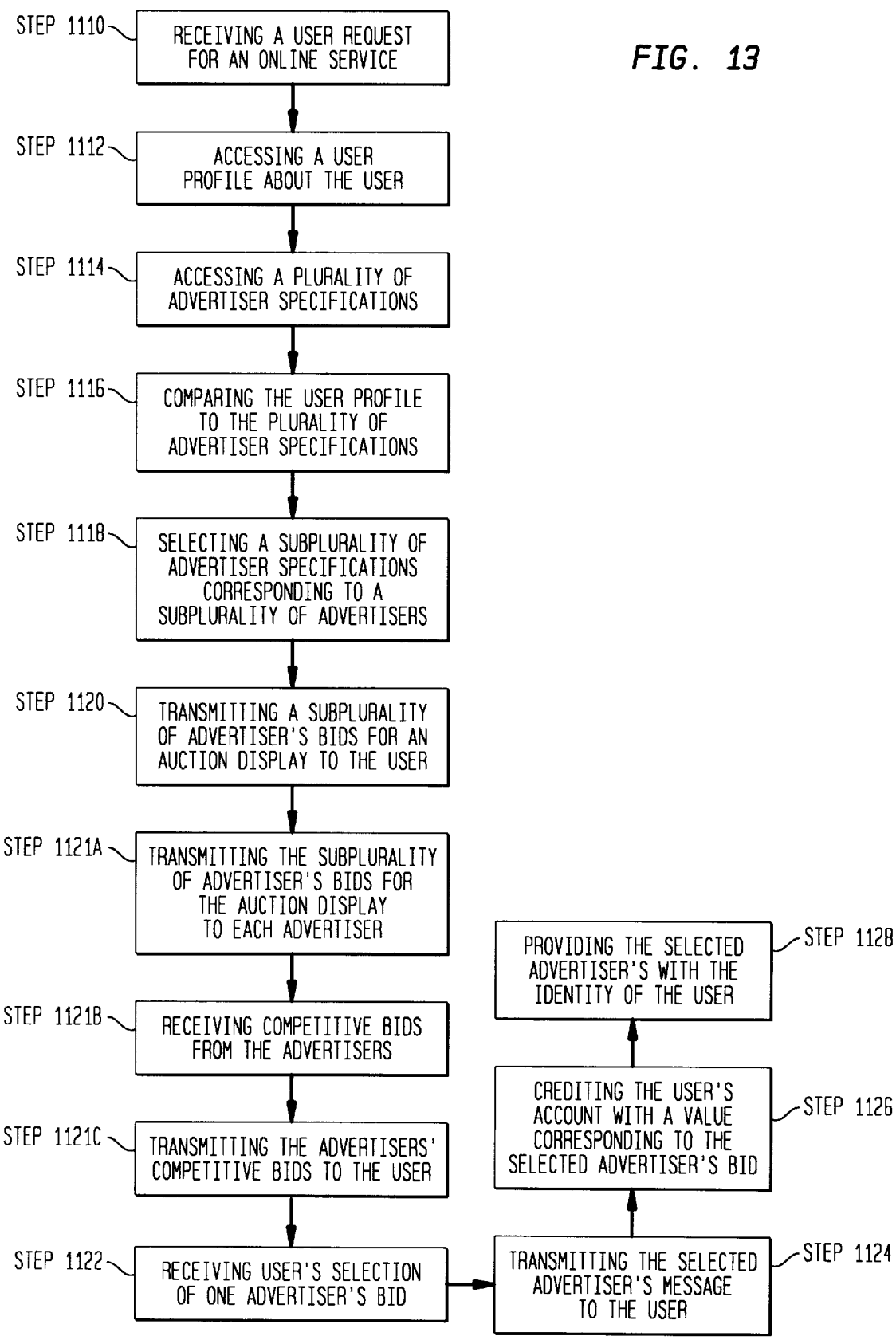
FIG. 13 is a flow diagram of the advertisers' online competitive bidding embodiment of FIG. 12.

An alternate embodiment of the invention is shown in FIG. 12 and 13, which provides online competitive bidding between advertisers. FIG. 12 illustrates the alternate embodiment of the invention for advertisers' online competitive bidding, as applied in an Internet network of FIG. 6. FIG. 12 adds to the server 660 of FIG. 6, the advertiser competitive bidding buffer 1250 and the advertiser bidding message buffer 1260.

FIG. 13 is a flow diagram of the advertisers' online competitive bidding embodiment of FIG. 12. The flow diagram of FIG. 13 follows many of the same numbered steps previously described for FIG. 11, but adds steps 1121A, 1121B, and 1121C. FIG. 13 depicts the advertisers' online competitive bidding method for managing access to advertising carried by a communications network. The steps of the method are as follows.

Step 1110 is receiving in the server 660, a user request for a service.

Step 1112 is accessing in the server 660, a user profile of user characteristics about the user.

Step 1114 is accessing in the server 660, at least two advertiser specifications of user characteristics, each specification associated with a respective advertiser.

Step 1116 is comparing in the server 660, the characteristics of the user from the user profile, with the user characteristics from each advertiser specification.

Step 1118 is selecting in the server 660, first and second selected advertiser specifications from the at least two specifications, corresponding to selected first and second respective advertisers.

Step 1120 is transmitting from the server 660 to the user, a first and second bid values corresponding to the first and second respective selected advertisers, for display to the user.

Step 1121A is transmitting from the server 660 to the user, the first and second bid values to the first and second selected advertisers, for display to the first and second advertisers.

Step 1121B is receiving in the buffer 1250 of server 660 from at least the first advertiser, a competitive bid value that revises the first bid of the first advertiser.

Step 1121C is transmitting from the buffer 1260 of server 660 to the user, the competitive bid value of the first selected advertisers, for display to the user.

Step 1122 is receiving in the server 660 from the user, a user selection of the bid value.

Step 1124 is transmitting from the server 660 to the user, an advertising message about the selected advertiser for an advertising display to the user.

Step 1126 is providing to the user a reward corresponding to the selected bid value, in response to the user having selected the advertiser.

Step 1128 is providing the selected advertiser with an identity of the user.

In the alternate embodiment of FIG. 12, the network can be a telephone network, an internet network, a cable television network, an earth-orbiting satellite communications network, or a radio frequency network, or a combination of such networks.

Figure 14:
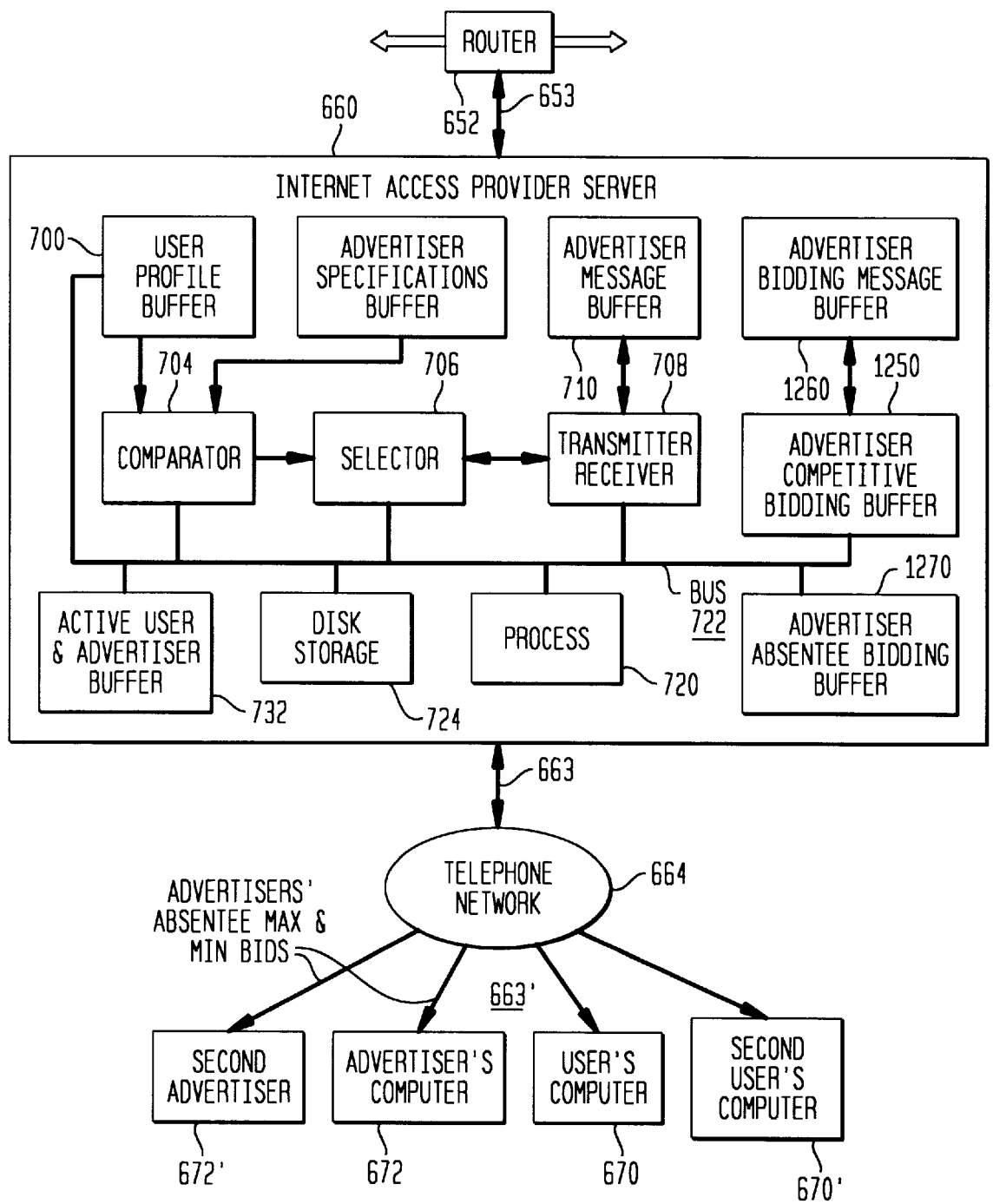
FIG. 14 is illustrates an alternate embodiment of the invention for advertisers' absentee bidding, as applied in an Internet network of FIG. 6.
Figure 15:
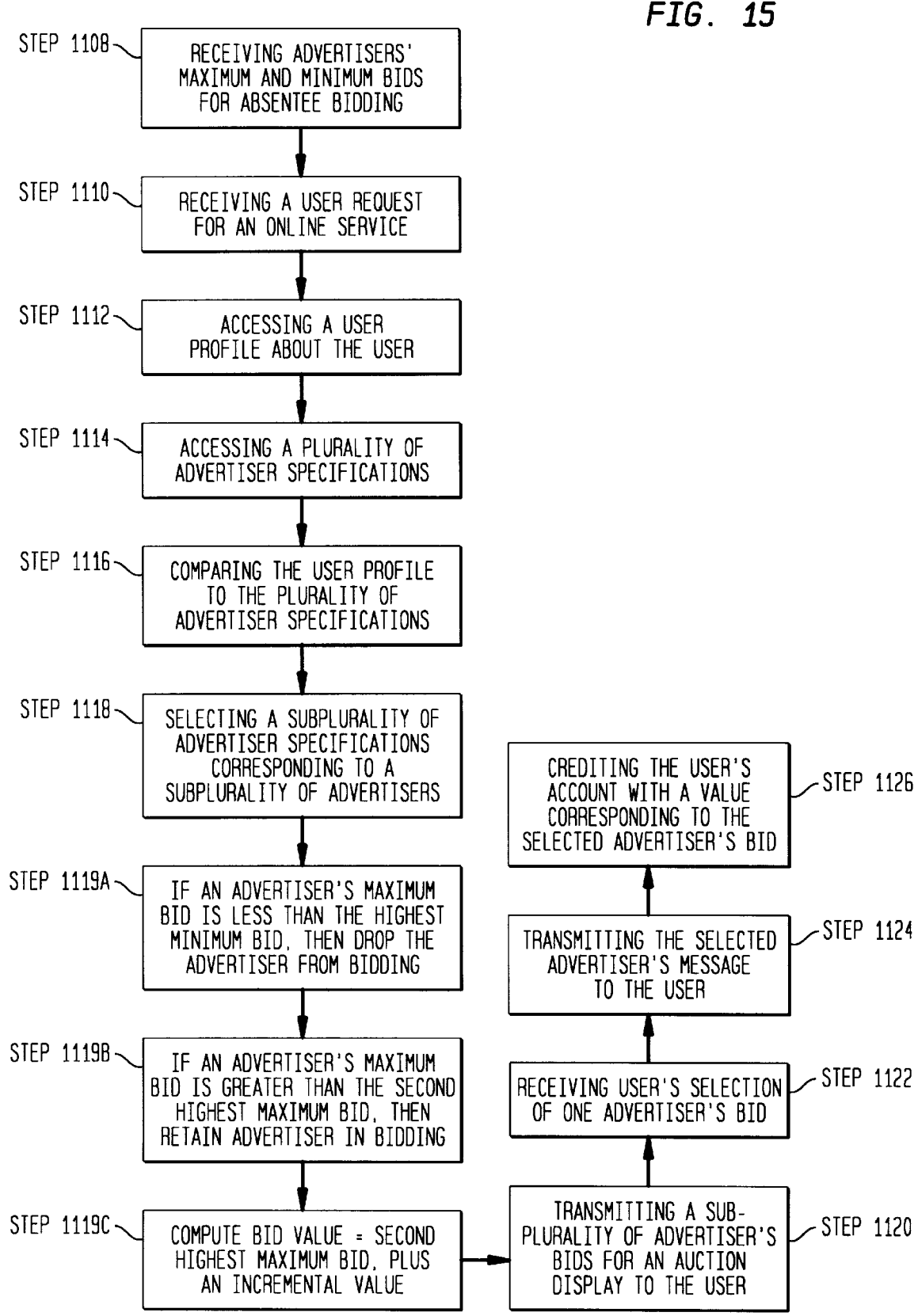
FIG. 15 is a flow diagram of the advertisers' absentee bidding embodiment of FIG. 14.

Another alternate embodiment of the invention is shown in FIG. 14 and 15, which provides automatic absentee bidding between advertisers. FIG. 14 illustrates this alternate embodiment of the invention for advertisers' absentee bidding, as applied in an Internet network of FIG. 6 and FIG. 12. FIG. 14 adds to the server 660 of FIG. 12, the advertiser absentee bidding buffer 1270.

FIG. 15 is a flow diagram of the advertisers' absentee bidding embodiment of FIG. 14. The flow diagram of FIG. 15 follows many of the same numbered steps previously described for FIG. 11, but adds steps 1108, 1119A, 1119B, and 1119C. FIG. 15 depicts the advertisers' automatic absentee bidding method for managing access to advertising carried by a communications network. The steps of the method are as follows.

Step 1108 is receiving in the absentee bidding buffer 1270 of the server 660, an advertiser's maximum and minimum bids for absentee bidding. This step can occur prior to the user coming online. The advertiser can be absent from the network and need not participate in the bidding when the user is online. The server 660 provides an automatic absentee bidding service for the advertisers who make use of it. The absentee bidding method of FIGS. 14 and 15 can operate simultaneously with the competitive bidding method conducted by other advertisers, in FIGS. 12 and 13.

Step 1110 is receiving in the server 660, a user request for a service.

Step 1112 is accessing in the server 660, a user profile of user characteristics about the user.

Step 1114 is accessing in the server 660, at least two advertiser specifications of user characteristics, each specification associated with a respective advertiser.

Step 1116 is comparing in the server 660, the characteristics of the user from the user profile, with the user characteristics from each advertiser specification.

Step 1118 is selecting in the server 660, first and second selected advertiser specifications from the at least two specifications, corresponding to selected first and second respective advertisers.

Step 1119A is if an advertiser from the subplurality of advertisers has a maximum bid less than a highest minimum bid of the subplurality of advertisers, then dropping the advertiser from bidding in server 660.

Step 1119B is if an advertiser from the subplurality of advertisers has a maximum bid greater than a second highest maximum bid of the subplurality of advertisers, then retain the advertiser in bidding in server 660.

Step 1119C is computing in the server 660, a computed bid value that is derived from the second highest maximum bid.

Step 1120 is transmitting from the server 660 to the user, the computed bid value for the retained advertiser, for display to the user.

Step 1122 is receiving in the server 660 from the user, a user selection of the bid value.

Step 1124 is transmitting from the server 660 to the user, an advertising message about the selected advertiser for an advertising display to the user.

Step 1126 is providing to the user a reward corresponding to the selected bid value, in response to the user having selected the advertiser.

This can be followed by Step 1128 in FIG. 11, of providing the selected advertiser with an identity of the user.

In still a further alternate embodiment, the highest "N" number of bids, including the computed bid value for the retained advertiser of step 1119C, can be transmitted to the user for auction display in step 1120.

In still another alternate embodiment, the algorithm for providing a computed bid value in steps 1119A, 1119B, and 1119C of FIG. 15 can be implemented in many ways. The computed bid value is derived from the maximum and minimum bids for the selected advertisers, and then transmitted from the server 660 to the user, for display to the user.

In the alternate embodiment of FIG. 14, the network can be a telephone network, an internet network, a cable television network, an earth-orbiting satellite communications network, or a radio frequency network.

Various illustrative examples of the invention have been described in detail. In addition, however, many modifications and changes can be made to these examples without departing from the nature and spirit of the invention.

What is claimed is:

1. A method for managing access to advertising carried by a communications network, comprising:

receiving in a network, an advertiser's maximum and minimum bids for absentee bidding;

receiving in a network, a user request for a service;

accessing in the network, a user profile of user characteristics about the user;

accessing in the network, at least two advertiser specifications of user characteristics, each specification associated with a respective advertiser;

comparing in the network, the characteristics of the user from the user profile, with the user characteristics from each advertiser specification;

selecting in the network, first and second selected advertiser specifications from the at least two specifications, corresponding to selected first and second respective advertisers;

if one of said advertisers has a maximum bid less than a highest minimum bid of said advertisers, then dropping said one advertiser from bidding;

if one of said advertisers has a maximum bid greater than a second highest maximum bid of said advertisers, then retain said one advertiser in bidding;

computing in the network, a computed bid value that is derived from said second highest maximum bid;

transmitting in the network to the user, said computed bid value for the retained advertiser, for display to the user;

receiving in the network from the user, a user selection of a bid value corresponding to a selected advertiser;

transmitting in the network to the user, an advertising message about the selected advertiser for an advertising display to the user; and providing to the user a reward corresponding to the selected bid value, in response to the user having selected the advertiser.

2. The method for managing access to advertising carried by a communications network of claim 1, wherein said network is a telephone network.

3. The method for managing access to advertising carried by a communications network of claim 1, wherein said network is an internet network.

4. The method for managing access to advertising carried by a communications network of claim 1, wherein said network is a cable television network.

5. The method for managing access to advertising carried by a communications network of claim 1, wherein said network is an earth-orbiting satellite communications network.

6. The method for managing access to advertising carried by a communications network of claim 1, wherein said network is a radio frequency network.

7. The method for managing access to advertising carried by a communications network of claim 1, which further comprises:

providing the selected advertiser with an identity of the user.

8. A method for managing access to advertising carried by a communications network, comprising:

receiving in a network, an advertiser's maximum and minimum bids for absentee bidding;

receiving in a network, a user request for a service;

accessing in the network, a user profile of user characteristics about the user;

accessing in the network, at least two advertiser specifications of user characteristics, each specification associated with a respective advertiser;

comparing in the network, the characteristics of the user from the user profile, with the user characteristics from each advertiser specification;

selecting in the network, first and second selected advertiser specifications from the at least two specifications, corresponding to selected first and second respective advertisers;

computing in the network, a computed bid value that is derived from said maximum and minimum bids for said selected first and second respective advertisers;

transmitting in the network to the user said computed bid value for display to the user;

receiving in the network from the user, a user selection of a bid value corresponding to a selected advertiser;

transmitting in the network to the user, an advertising message about the selected advertiser for an advertising display to the user; and providing to the user a reward corresponding to the selected bid value, in response to the user having selected the advertiser.

9. The method for managing access to advertising carried by a communications network of claim 8, wherein said network is a telephone network.

10. The method for managing access to advertising carried by a communications network of claim 8, wherein said network is an internet network.

11. The method for managing access to advertising carried by a communications network of claim 8, wherein said network is a cable television network.

12. The method for managing access to advertising carried by a communications network of claim 8, wherein said network is an earth-orbiting satellite communications network.

13. The method for managing access to advertising carried by a communications network of claim 8, wherein said network is a radio frequency network.

14. The method for managing access to advertising carried by a communications network of claim 8, which further comprises:

providing the selected advertiser with an identity of the user.

15. A system for managing access to advertising carried by a communications network, comprising:

means for receiving in a network, an advertiser's maximum and minimum bids for absentee bidding;

means for receiving in a network, a user request for a service;

means for accessing in the network, a user profile of user characteristics about the user;

means for accessing in the network, at least two advertiser specifications of user characteristics, each specification associated with a respective advertiser;

means for comparing in the network, the characteristics of the user from the user profile, with the user characteristics from each advertiser specification;

means for selecting in the network, first and second selected advertiser specifications from the at least two specifications, corresponding to selected first and second respective advertisers;

means for computing in the network, a computed bid value that is derived from said maximum and minimum bids for said selected first and second respective advertisers;

means for transmitting in the network to the user, said computed bid value for display to the user;

means for receiving in the network from the user, a user selection of a bid value corresponding to a selected advertiser;

means for transmitting in the network to the user, an advertising message about the selected advertiser for an advertising display to the user; and means for providing to the user a reward corresponding to the selected bid value, in response to the user having selected the advertiser.

16. The system for managing access to advertising carried by a communications network of claim 15, wherein said network is a telephone network.

17. The system for managing access to advertising carried by a communications network of claim 15, wherein said network is an internet network.

18. The system for managing access to advertising carried by a communications network of claim 15, wherein said network is a cable television network.

19. The system for managing access to advertising carried by a communications network of claim 15, wherein said network is an earth-orbiting satellite communications network.

20. The system for managing access to advertising carried by a communications network of claim 15, wherein said network is a radio frequency network.

21. The system for managing access to advertising carried by a communications network of claim 15, which further comprises:

provides the selected advertiser with an identity of the user.

22. A method for managing access to advertising carried by a communications network, comprising:

receiving in a network, maximum and minimum bids for absentee bidding from each of a plurality of absentee advertisers;

if an absentee advertiser of said plurality has a maximum bid less than a minimum bid of other advertisers of said plurality, then dropping the advertiser from bidding;

if an absentee advertiser of said plurality has a maximum bid greater than a second highest maximum bid of other advertisers of said plurality, then retaining said first advertiser in bidding;

computing in the network, a computed bid value that is derived from said second highest maximum bid;

transmitting in the network to a user, said computed bid value for at least some of the absentee advertisers of said plurality, for display to a user;

receiving in the network from the user, a user selection of a bid value corresponding to a selected absentee advertiser; and transmitting in the network to the user, an advertising message about the selected absentee advertiser.

23. A method for managing access to advertising carried by a communications network, comprising:

receiving in a network, maximum and minimum bids for absentee bidding from first and second absentee advertisers;

computing in the network, first and second computed bid values, each said value being derived from respective said maximum and minimum bids for each of said first and second absentee advertisers;

transmitting in the network to a user, said first and second computed bid values;

receiving in the network from the user, a user selection of a bid value corresponding to said first advertiser; and transmitting in the network to the user, an advertising message about the first absentee advertiser.

* * * * *